Oct. 31, 1939.    J. B. SAXE    2,178,314
ELECTRIC INDICATING SYSTEM
Filed April 8, 1935    5 Sheets-Sheet 2
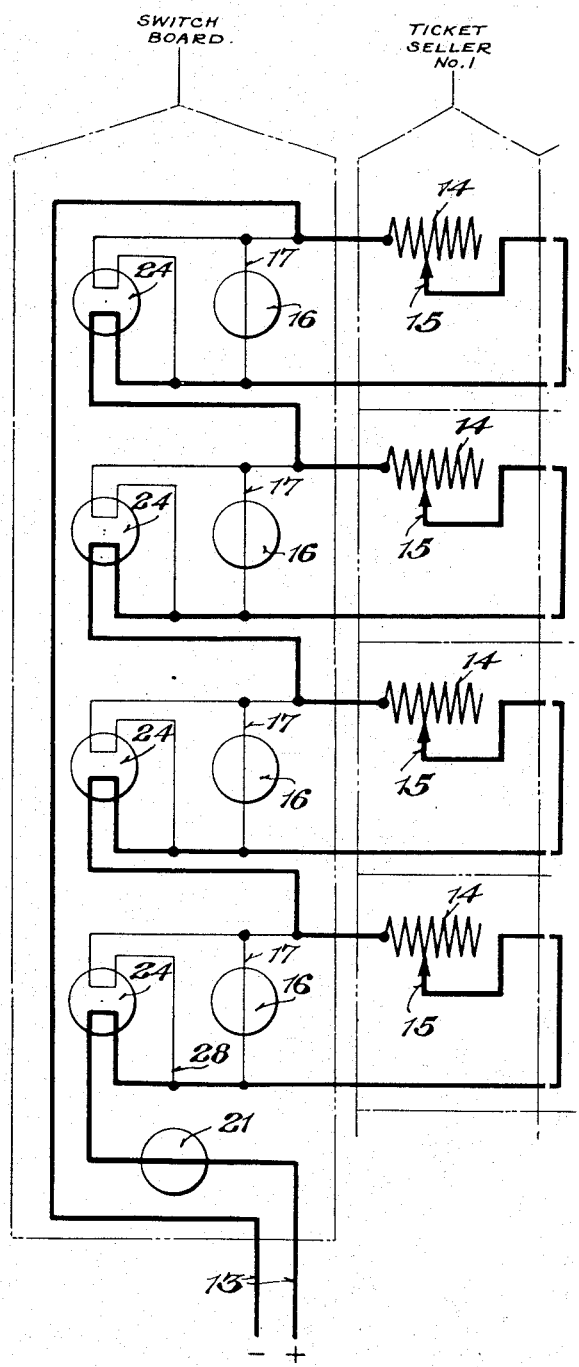
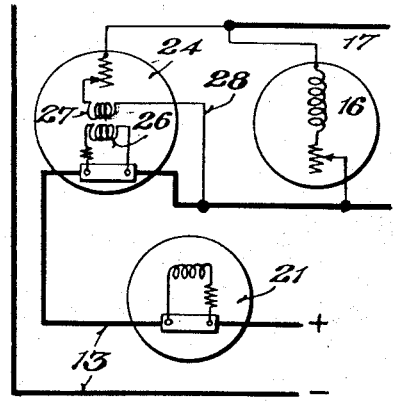
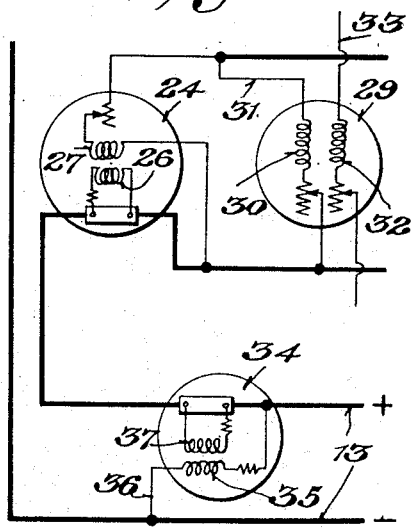

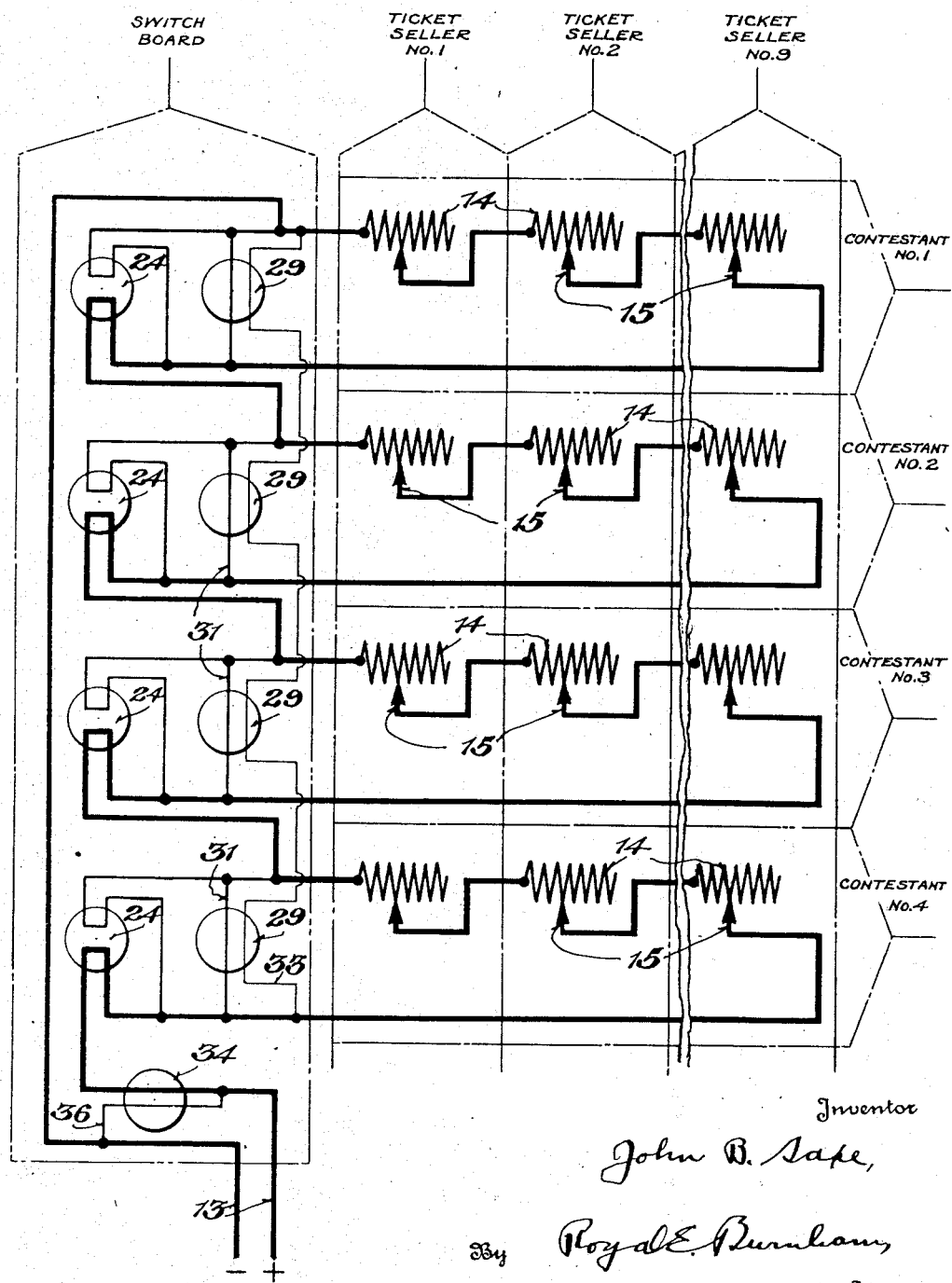

Oct. 31, 1939.  J. B. SAXE  2,178,314
ELECTRIC INDICATING SYSTEM
Filed April 8, 1935  5 Sheets-Sheet 3

Inventor
John B. Saxe,
By Royal E. Burnham,
Attorney

Oct. 31, 1939.   J. B. SAXE   2,178,314
ELECTRIC INDICATING SYSTEM
Filed April 8, 1935   5 Sheets-Sheet 4

Inventor
John B. Saxe,
BY
Royal E. Burnham,
Attorney

Oct. 31, 1939.   J. B. SAXE   2,178,314
ELECTRIC INDICATING SYSTEM
Filed April 8, 1935   5 Sheets-Sheet 5

Inventor
John B. Saxe,
By Royal E. Burnham,
Attorney

Patented Oct. 31, 1939

2,178,314

UNITED STATES PATENT OFFICE 2,178,314

ELECTRIC INDICATING SYSTEM

John B. Saxe, Narberth, Pa.

Application April 8, 1935, Serial No. 15,341

9 Claims. (Cl. 235—61)

The invention relates to an electric system indicating totals of values or other factors and the ratio or proportion among them one to others.

The system provided by the invention includes, for every class of values or factors to be totalized and indicated, a group of series-connected resistances variable to alter potential, or voltage drop or voltage increase, in proportionate response to the amount or value of the factors entering the total, and a meter indicating the total of the group. The system also includes a meter indicating the total of all groups, and meters indicating the ratio of the aggregate of all groups to every group total. These meters are responsive at all times to the electrical magnitude or quantity in the circuit.

It is an object of the invention to provide a system of this kind that functions satisfactorily, without the use of complicated and expensive instruments and other devices, and that at all times accurately indicates totals and ratios.

When considered with the description herein, the characteristics of the invention are apparent from the accompanying drawings, wherein a system adapted to indicate mutual odds on contestants is disclosed, for purposes of illustration.

Although the invention is exemplified herein by such a system, it is to be understood that it is not limited necessarily thereto, as adaptations to other purposes and modifications within the limits of the claims can be made without departing from the nature of the invention.

Like reference-characters refer to corresponding parts in the views of the drawings, of which—

Fig. 1 is a diagram of one circuit arrangement;

Fig. 2 is a diagram of another circuit arrangement;

Fig. 3 is an enlarged diagram of meter connections as shown by Fig. 2;

Fig. 4 is an enlarged diagram of meter connections as shown by Fig. 1;

The explanation of the system herein is on the basis of use of direct current, but the system also is adapted to use of alternating current.

As disclosed by Fig. 2, the system has a main circuit 13 connected with a constant-voltage source of electrical supply (not shown), and in which circuit are series-connected groups of variable resistances or impedances 14, which may be of any of the well-known suitable forms, and the shiftable contacts of which are designated by 15.

Assuming that the system is for use to indicate the total amount wagered on each contestant in a race, the aggregate wagered on all contestants, and the ratio, proportion, or odds of the aggregate to the total wagered on each contestant, there is a group of resistances for each contestant, and across these groups the resistances are in groups corresponding to the places where tickets are sold or wagers taken.

Figure 6:
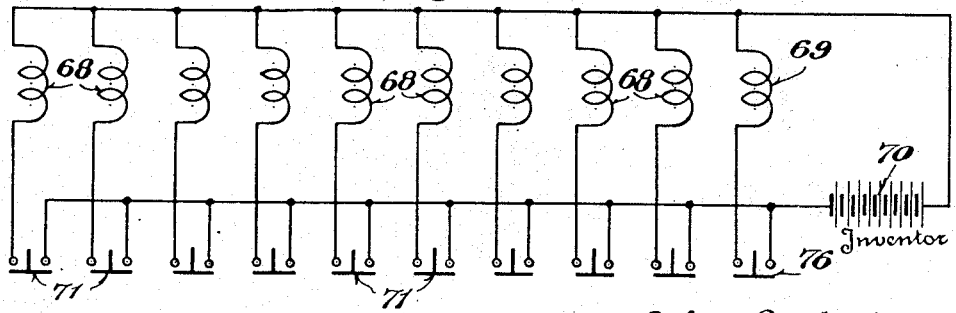
Fig. 6 is a diagram of the operating circuit of the mechanism exemplified by Fig. 5.
Figure 10:
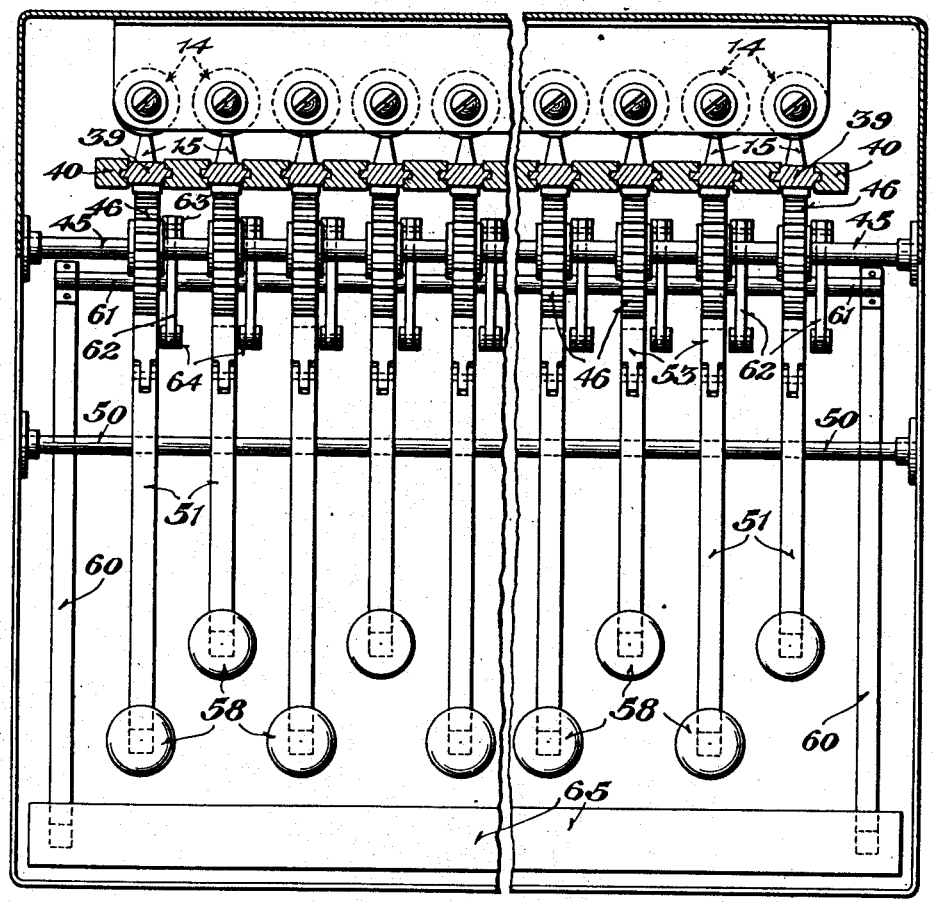
Fig. 10 is a plan view of the key-bank and other parts of a contact-shifting mechanism, certain parts being shown in section.

Ordinarily, a system such as this as installed will have sufficient numbers of the two classes of groups to accommodate, respectively, the maximum number of contestants in any race and the maximum number of ticket-selling or wager-taking places that may be in use. If any of the contestant groups or wager-place groups of resistances are not used during any contest, the accurate functioning of the system is not affected. The drawings show by Figs. 1 and 2 groups of resistances for four contestants, Fig. 1 inferentially indicates groups for nine ticket-selling or wager-taking places, and Figs. 6 and 10 show keys for nine contestants in a machine at one ticket-selling or wager-taking place. That is sufficient for illustrative purposes, but usually at most places of contest the system will contain groups of resistances for more contestants and groups for more ticket-sellers or wager-takers.

The difference in potential or voltage drop in each group of resistances assigned to a contestant is the product of current in amperes flowing in the circuit and the total resistance in ohms imposed therein for the contestant. The total resistance in ohms in a contestant group of resistances is made proportional to the total wagers on the contestant by movement of the shiftable contacts 15.

The current in amperes is inversely proportional to the total resistance in ohms in the entire circuit. Since the total resistance in the entire circuit is made proportional to the total wagers on all contestants by shift of the contacts 15, the current flowing in the circuit is inversely proportional to the aggregate wagers on all contestants. The difference in potential or voltage drop in each contestant group of resistances is directly proportional to the ratio of the amount wagered on the contestant to the aggregate wagered on all contestants, and inversely proportional to the mutual odds on the contestant.

Figure 8:
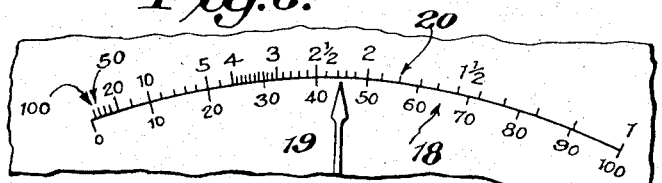
Figs. 8 and 9 are fragmentary view of meter dials.

For each contestant group of resistances, there is a voltmeter 16 connected by a shunt 17 across the circuit of that group, which measures and indicates the voltage drop of the group. The essential part of the dial of such a meter is shown by Fig. 8, which has a scale 18 below the arcuate line by which the pointer 19 indicates voltage and a scale 20 above that line having numerals indicating ratio, proportion, or mutual odds. Indicia "to 1" are omitted from the latter scale, the observer always assuming their presence, and thus they are not necessary for practical purposes. The lines of the scale as shown are spaced according to the inverse proportion existing between the voltage drop and the odds. Where indication of voltage is not essential, as where the system is used to show mutual odds on contestants, the volt-scale may be omitted.

By way of example, assuming that
V = constant voltage in the circuit;
I = current in amperes flowing in the circuit;
r = resistance in ohms placed in the circuit for a contestant;
R = aggregate resistance placed in the circuit for all contestants;
k = a constant for the entire circuit, being in this instance the amount of resistance in ohms to be imposed in the circuit per dollar wagered;
m = money in dollars wagered on a contestant;
M = aggregate money in dollars wagered on all contestants;
v = the difference in potential or voltage drop across the resistances assigned to a contestant; then, as a result of shifts of the contacts 15, we have:

$r = km$ and $R = kM$;

$v = Ir$; and, since $V = IR$, $v = \frac{Vr}{R} = \frac{Vm}{M}$; and, since $\frac{M}{m} =$ mutual odds, then mutual odds $= \frac{V}{v}$, where V is a known constant in volts.
Assuming that
V = 100 volts,
then for every value of $v$ in volts there is a corresponding value or odds indicated on the dial such as shown by Fig. 8.

Figure 9:
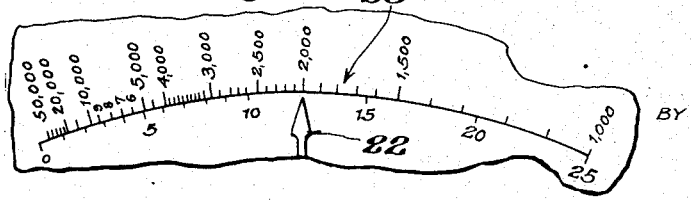

An ammeter 21 in the main circuit indicates by its pointer 22 the aggregate money in dollars wagered on all contestants, the amount being shown by its dial having a scale 23 indicating dollars as disclosed by Fig. 9.

We have made $R = kM$; hence $M = \frac{R}{k}$; and, since $V = IR$, then $M = \frac{V}{kI}$, where V and k are known constants. Hence for every value of I in amperes, there is a corresponding value of M in dollars.

By way of example, assuming that
$k = .004$ and $V = 100$ volts,
the dial of the meter is as shown by Fig. 9, whereon the lines of the scale 23 are spaced according to the inverse proportion existing between the current flowing in the circuit and the total wagers on all contestants. The ampere-scale may be omitted, if not needed.

The amount wagered on each contestant is proportional to the total resistances in the group of the contestant. The amount of this resistance for each contestant is the voltage drop across the group of resistances divided by the current flowing in the circuit.

Figure 11:
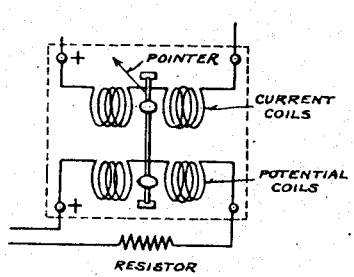
Fig. 11 is a view of a meter.
Figure 12:
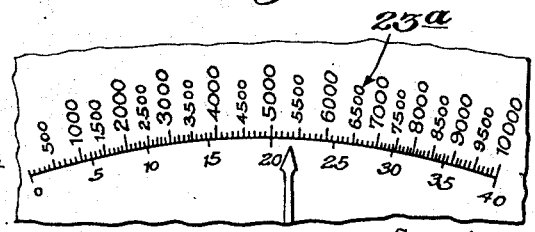
Fig. 12 is a fragmentary view of a meter-dial.

This quotient may be determined and indicated by a ratio-meter, one for each contestant, shunt connected across each group of contestant resistances and also connected in the main circuit. This meter may be of any suitable type, such, for example, as that shown by United States Patent No. 1,033,409, or an instrument using magnetic vanes as shown diagrammatically by Fig. 11. This ratio-meter is designated by 24 in Figs. 3 and 4, and it has a dial with a scale 23a as shown by Fig. 12. This scale is graduated to, and has numerals indicating, dollars. For example, ratio "4" indicates $1,000, ratio "8" indicates $2,000, ratio "12" indicates $3,000, and so on.

The meter 24 has one set of its coils 26 or equivalent parts connected in the main circuit and its other set of coils 27 or equivalent parts in a shunt 28 across the contestant group of resistances; and the meter is arranged to divide the voltage "v" across the contestant group by the current "I" flowing in the circuit. Thus the meter determines and indicates the ratio $$\frac{v}{I}$$

which is translated on the scale into dollars.

In the arrangement of variable resistances hereinbefore described, the main circuit is assumed to be connected with a source of electricity with a fixed voltage or constant electromotive force. However, the necessity therefor may be avoided by an arrangement such as shown by Fig. 1. For each contestant group of resistances in series, there is a ratio-meter 29, of suitable type such as before referred to, one set of its coils 30 being in a shunt 31 across the group of contestant resistances and the other set of its coils 32 being in a shunt 33 across the entire main circuit. The meter divides the voltage "V" impressed on the entire circuit by the voltage "v" across the contestant group of resistances. As previously explained, the mutual odds equal $$\frac{V}{v}$$

even though "V" may be a fluctuating voltage, and is indicated on the ordinary ratio-scale of the meter.

A ratio-meter 34 has one set of its coils 35 in shunt 36 across the entire circuit and the other set of its coils 37 in the main circuit 13. The meter is arranged to divide the voltage "V" impressed on the entire circuit by the current "I" flowing in the circuit, and its reading will be independent of fluctuations of "V", since any fluctuation of "V" will cause a corresponding fluctuation in "I", and the ratio will remain the same. As previously shown, $$M = \frac{V}{kI}$$

and the aggregate wagers on all contestants will equal the ratio $$\frac{V}{I}$$

which is determined and indicated by the ratio-meter 34, divided by a known constant "k". Assuming that k=.004, then for every value of the ratio $$\frac{V}{I}$$

there is a corresponding value of "M", the aggregate wagers in dollars, which is shown on a scale such as disclosed by Fig. 12.

A ratio-meter 24 is incorporated into this system shown by Figs. 1 and 4 in the same manner, and for the same purpose, as the system shown by Figs. 2 and 3. The indication of this meter will be independent of the voltage impressed on the circuit, fluctuations in "V" affecting "v" and "I" correspondingly and the ratio $$\frac{v}{i}$$

remaining the same.

As is apparent from the foregoing, the system is arranged so that, and contains means whereby, measurement of electrical quantities in portions of the circuit and in the entire circuit gives indication of totals, and measurement of electrical quantities in portions of the circuit gives indication of ratio or mutual odds. For example, referring to Fig. 2, a meter 24, which is affected both by the electrical quantity of its group portion of the circuit and the electrical quantity of the entire circuit, indicates the total of its group; and a meter 16 by measuring the electrical quantity of its group portion of the circuit indicates ratio or mutual odds.

Figure 5:
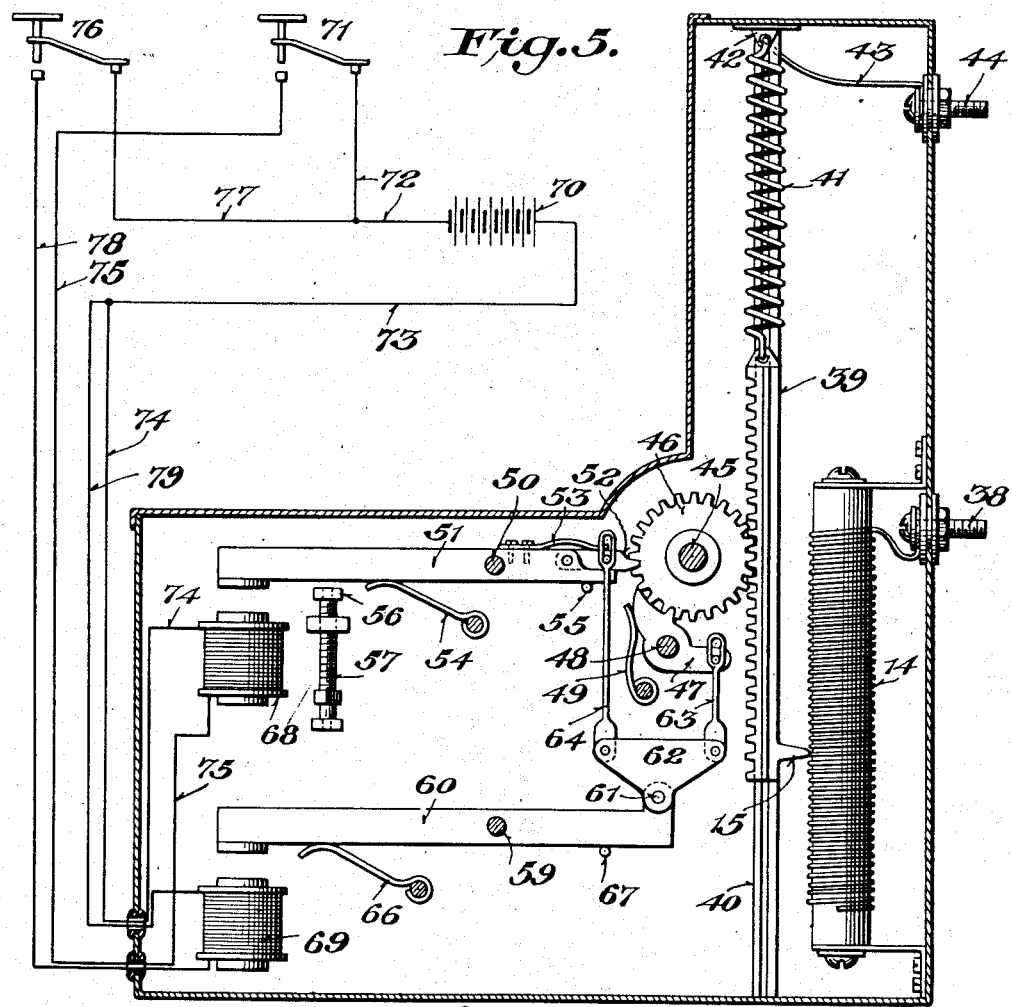
Fig. 5 is a section of an electrically-actuated contact-shifting mechanism, the operating circuit thereof being shown diagrammatically.
Figure 7:
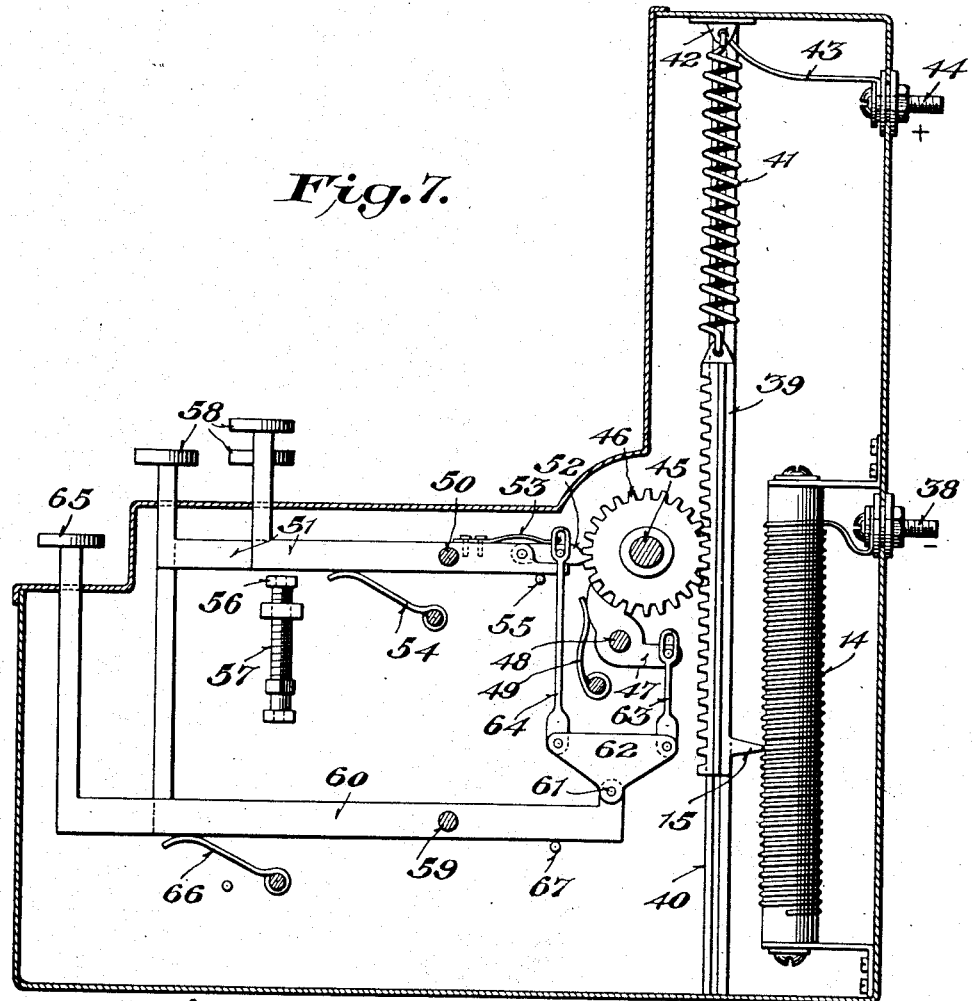
Fig. 7 is a section of a manually-actuated contact-shifting mechanism.

The resistances 14 may be coils of uniform wire uniformly wound on cylinders of insulating material, as shown by Figs. 5 and 7, or other suitable forms of resistances may be employed.

The resistances, means for shifting their contacts, conductors, meters, and other parts of the system are coordinated, integrated, and calibrated so that a definite amount of movement of a contact corresponds and is in proportion to a certain factor, value, or unit, or to a fraction or multiple thereof, as, for example, to $1 and multiples thereof in the present exemplification, and that factor accurately enters into the totals and ratios to be indicated by the meters.

Although $1 is referred to as the unit basis in explaining an adaptation of the invention to a system to indicate mutual odds on contestants, the total wagered on each contestant, and the aggregate wagered on all contestants, it is to be understood that that is for explanatory purposes only, that any other unit or factor may be used, and that the system may be used in other and quite distinct computations to indicate totals of values or other factors and the ratio or proportion among them one to others.

Step-by-step movements may be imparted to the contacts, each movement in extent in accordance with the factor or value to enter into the computation, by any suitable means, as, for example, by either of those described as follows, or by a combination of both of them:

As seen in Figs. 7 and 10 with reference to a manually-operated machine, and also in Fig. 5 with reference to certain parts of an electrically-operated machine, each machine contains a resistance for each of the contestants, and thus it has a ticket-seller's or wager-taker's group across the contestant groups when we visualize the system as shown diagrammatically by Figs. 1 and 2. Each of these "machine" or "operating" groups of resistances is positioned in line in a contact-point actuating mechanism, and thus in each machine there is a resistance for each contestant.

The winding of each resistance is connected at terminal 38 with one side of the circuit of the contestant group to which it belongs, and its contact-point 15 is connected with the other side of that circuit as later explained.

The contact-point 15 of each resistance is on a rack 39 movable parallel to the resistance in guides 40, in one direction against and in the other direction in response to the recessive urge of a spring 41. This spring is connected at one end to the rack and at the other end to a fixed part 42, and it is connected through a conductor 43 and a terminal 44 with the other resistances of its own contestant series.

A shaft 45 positioned adjacent to the racks has journaled thereon gears 46, each of which is in mesh with a rack 39. For each gear there is a pawl 47, pivoted at 48, and pressed by a spring 49 against its gear, the pawl cooperating with the gear, untill it is released, to prevent recessive movement of the rack under the urge of spring 41.

Upon a shaft 50, parallel to shaft 45, operating-levers 51 are fulcrumed, there being a lever for each gear. Each lever carries at one end a pivoted dog 52 pressed downwardly by a spring 53, the dog being arranged to impart rotative movement to its gear when it is moved upwardly. At the other side of the fulcrum, a spring 54 pressing upwardly against the lever holds the latter in normal or inactive position against a stop 55. A stop 56 limits movement of the lever in operating direction.

It may be assumed that the parts of the system are coordinated so that a turn of the gear 46 from one tooth to the next of pawl engagement will shift the contact-point controlled thereby precisely the amount required to introduce exactly one unit or factor of computation into the system. In order that the lever may have just the range of swing to effect that result, each stop 56 may be adjustable in any suitable manner, as, for example, by being on a screw 57 as seen in Figs. 5 and 7.

Moreover, a stop so mounted with relation to each lever may be adjusted to permit sufficient swing of the lever to shift the contact-point the equivalent of two or more factors or units, or fractions thereof.

The parts so far described may be used in mechanisms in which the operating-levers 51 are actuated either manually or electrically.

For manual operation, each lever 51 has a key 58 to be pressed downwardly by the operator to cause the corresponding contact-point to shift through the instrumentality of the gear-rack train pertaining thereto.

After step-by-step shifting of the contact-points has been completed, as at the desired time after the taking of wagers on a contest has ceased, all contacts may be cleared to neutral or "beginning" positions by release mechanisms as disclosed by Figs. 5, 7, and 10.

Fulcrumed on a shaft 59, release-levers 60 carry at one end a rod 61 on which are mounted yokes 62, one for each gear-pawl 47. Links 63 and 64 connected, respectively, with the pawl 47 and dog 52, operate on upward movement to release those parts from their gear 46, whereupon spring 41 moves the rack and thus its contact-point back to the place from which its shifting previously had begun. The other ends of the two release-levers carry an elongated key 65 to receive downward pressure to give releasing movement to the levers against a spring 66 that maintains them in normal position against a stop 67.

When the several contact-shifting mechanisms of the system are located comparatively close together, and thus too long conductors are not required to connect groups of resistances and other elements of the system, manual operation of these mechanisms is practical. However, when, because of electrical factors, complications, and other reasons, it is either preferable or necessary to locate all resistances and meters as compactly as practicable in a place where they are not susceptive to extraneous disturbances, then the operating and release levers may be actuated by remotely-controlled electrical means such as exemplified by Figs. 5 and 6.

As seen in Fig. 5, each of the operating-levers 51 has adjacent to it an electro-magnet or solenoid 68 arranged to swing it in operating direction to turn its corresponding gear 46. An electro-magnet or solenoid 69 is adjacent to one or both of the release-levers 60 and arranged to swing the levers in releasing direction to permit clearance of the resistance-contacts to neutral or "beginning" positions. This electrical actuation results in the same operation of the mechanism as hereinbefore explained for manual actuation.

Each of the operating-lever solenoids 68 has its winding connected in circuit with a source of electricity 70 and with a key-controlled normally open switch 71 by conductors 72, 73, 74, and 75. The release-lever solenoid 69 is connected with the source and with a key-controlled normally open switch 76 by conductors 72, 77, 78, 79, and 73.

When the system is installed for use to indicate the total money wagered on every contestant in a contest, the aggregate wagered on all contestants, and the ratio (odds) of the aggregate to the total on each contestant, machines such as hereinbefore described, each containing an operating group of resistances 14, or key-banks of electrically-actuated machines, are located at convenient places for the sale of tickets or receipt of wagers.

Every key 58 in a manually-operated machine and every key of switches 71 controlling an electrically-actuated machine bears indication of a particular contestant.

When an operating-lever 51 is swung a definite amount as defined by the range between its two stops 55—56, either by manual operation or as a result of closing the switch 71 pertaining thereto, the contact 15 controlled by the lever is shifted, through the gear-rack train, the distance requisite to introduce a definite value or factor into the circuit of the system.

Visualizing a lay-out of resistances and other parts as exemplified diagrammatically by Fig. 1, every ticket-seller No. 1, No. 2, etc., has, or controls, a machine with its operating-levers set for a definite value and containing a group of resistances across the several contestant groups, so that every machine contains resistances for all contestants. One machine may be set for a value of $1, another for $2, and so on, or for other units.

Taking as an example ticket-seller No. 1, whose machine is assumed to be set for $1: When he sells a ticket on contestant No. 1, he presses the key in his key-bank pertaining to that contestant. As a result, the contact of that contestant's resistance is shifted a corresponding value distance; the current in the circuit is reduced correspondingly; the difference of potential for that contestant's group is altered by increase of resistance and to a lesser extent by reduction of current in the circuit; and the difference in potential for the other contestant groups is altered by reduction of current in the circuit.

Results in accordance with values come in the same manner from operation of keys of other ticket-sellers, so that the current in the circuit is reduced and the difference in potential for the contestant groups is affected during the taking of wagers to the extent wagers are placed on the contestants.

At all places where action resulting in shift of the contacts is initiated, it is immaterial whether the action occurs simultaneously or at different times, for all or any of the contacts in any or all of the series-connected contestant groups may be moved simultaneously and the resulting factor imposition accurately taken into the system.

Continuously during the selling of tickets and when selling has ceased, meters 24 indicate the total value of tickets sold and recorded in their respective groups on the respective contestants thereof, the meter 21 or 34 indicates the aggregate of all tickets sold on all contestants, and the meters 16 or 29 the ratio of the aggregate of all groups to the total of their respective groups and thus the mutual odds.

At the desired time after selling of tickets has stopped, the contact-points may be restored to "beginning" position, and thus made ready for another contest, by actuation of the release-lever as hereinbefore explained.

What I claim as new, and desire to secure by Letters Patent, is—

1. An electric computing system of connected groups of circuits comprising mains connectable with a source of electric supply, a plurality of series-connected groups of independently variable resistances connected in series across said mains, means for varying each of said resistances in proportion to a factor of computation, a first ratio-meter associated with each group having a current responsive element connected in series with its group and a voltage responsive element connected across the terminals of its group so as to respond to the ratio of the amperes flowing through the group to the voltage across the terminals of the group, a second ratio-meter associated with each group having a voltage element connected across the terminals of its group to respond to changes in voltage drop across that group and a separate voltage coil connected in series with the corresponding separate coils in the other second ratio-meters of the remaining group circuits, all of said series connected meter coils being connected in series across the terminals of the system to respond to a change in voltage drop across said terminals, each of said second ratio-meters being thus connected to respond to the ratio of the voltage across each group to the voltage across the mains, and a third ratio-meter with one coil connected in series with said mains so as to be responsive to current changes in the main circuit and a separate coil connected in parallel to said mains so as to respond to changes in voltage drop across the mains, the third ratio-meter being thus arranged to respond to the ratio of the amperes flowing through all the resistances in series to the volts across said mains.

2. An electric computing system of connected groups of circuits comprising mains connectable with a source of electric supply, a plurality of series-connected groups of independently variable resistances connected in series across said mains, means for varying each of said resistances in proportion to a factor of computation, a first ratio-meter associated with each group having a current responsive element connected in series with its group and a voltage responsive element connected across the terminals of its group so as to respond to the ratio of the amperes flowing through the group to the voltage across the terminals of the group, a second ratio-meter associated with each group having a voltage element connected across the terminals of its group to respond to changes in voltage drop across that group, and a separate voltage coil connected to respond to a change in voltage drop across the mains, each of said ratio meters being thus connected to respond to the ratio of the voltage across each group to the voltage across the mains, and a third ratio-meter with one coil connected in series with said means so as to respond to current changes in the main circuit and a separate coil connected in parallel to said mains so as to respond to changes in voltage drop across the mains, the third ratio meter being thus arranged to respond to the ratio of the amperes flowing through all the resistances in series, to the volts across the said mains.

3. An electric computing system comprising a main circuit containing series-connected groups of variable resistances connected in series, means for altering any of said resistances in proportion to a factor of computation to vary the ratio of the resistance of its group to the total resistance of said series of groups and consequently the ratio of the voltage $v$ across its group to a given voltage $V$ across the series of groups, a first electric meter associated with each group having an actuating winding connected across the terminals of its group and thus energized in proportion to the voltage across the group, said meter being calibrated to indicate values proportional to the quotient of the voltage $v$ to which it responds divided into the given voltage $V$ across the series of groups, translated into values proportional to the quotient of the sum of all the factors of computation divided by the sum of all the factors of computation in proportion to which the resistances of its associated group is altered, a ratio-meter associated with each group having an actuating winding connected across the terminals of its group and another actuating winding connected in series with the main circuit, said windings acting upon a common indicating responsive means to operate the same in response to the quotient of the voltage across the terminal of its group divided by the current in the series circuit, said ratio-meter being calibrated in values proportional to said latter quotient and translated into values representing the total factor of computation in proportion to which the resistance of its associated group is altered, and an electric meter connected in the main circuit to respond to the power supplied to the main circuit and calibrated in values indicating the sum of all the factors of computation in proportion to which the several resistances are varied.

4. Means for computing relations of factors representing amounts of wagers on different contestants which comprises a plurality of independently variable resistances connected in series, means of applying a source of current of a known voltage $V$ to the extreme terminals of the series of resistances, means for adjusting each of said resistances to a value proportional to the wagers made on each of the contestants respectively, thereby; varying the voltage $v$ across the terminals of each said variable resistance in relation to the voltage $V$ across the terminals of the entire series of resistances such that $$\frac{V}{v}$$

will be proportional to the mutual odds on the contestant represented by that independently variable resistance, and varying the current $I$ flowing through the series of resistances such that $$\frac{v}{I}$$

is proportional to the amount of wagers on the contestant represented by that independently variable resistance, and $$\frac{V}{I}$$

is proportional to the total wagers on all contestants; an electric meter calibrated in values of $$\frac{V}{v}$$

translated into mutual odds connected across the terminals of each said variable resistance, an electric ratio-meter having a voltage coil connected across the terminals of each said independently variable resistance and a current coil connected in series with the entire series of resistances, said meter being calibrated in values of $$\frac{v}{I}$$

translated into amounts of wagers, and an electric ratio-meter having a voltage coil connected across the extreme terminals of the series of resistances and a current coil connected in series with the entire series of resistances, said meter being calibrated in values of $$\frac{V}{I}$$

translated into amounts of wagers.

5. An electric computing system comprising a main circuit containing series-connected groups of independently variable resistances connected in series, means for adjusting any of said resistances to a value proportional to a factor of computation thus making the ratio of the voltage $v$ across its group to a given voltage $V$ across the series of groups equal to the ratio of the factor of computation represented by the resistance of its group to the sum total of all the factors of computation represented by the several resistances of all the groups, a first electric meter associated with each group having an actuating element responsive to voltage variations connected across the terminals of its group, said meter being calibrated in values proportional to $$\frac{V}{v}$$

a ratio meter associated with each group connected to respond to the quotient of the voltage across the terminals of its group divided by the current in the series circuit, said ratio-meter being calibrated in values proportional to said last quotient, and an electric meter connected in the main circuit to respond to the power supplied to the main circuit, said last mentioned meter being calibrated in values indicating the sum total of all the factors of computation represented by the several resistances of all the groups.

6. An electric computing system comprising mains connectable to a source of electric supply, a plurality of groups of independently variable resistances all connected in series across said mains, means for varying the value of said resistances each in proportion to a factor of computation, an electric meter associated with each group connected to respond to variations in the total resistance of that group during passage of current through said resistance, a ratio-meter associated with each group connected to respond to the quotient of the voltage across the mains divided by the voltage across the terminals of that group, and a ratio-meter connected to respond to the quotient of the voltage across the whole circuit divided by the current therein, said meters being calibrated in values of computation proportional to the values to which they respond.

7. An electric computing system comprising mains connectable to a source of electric supply, a plurality of groups of independently variable resistances all connected in series across said mains, a first independently variable resistance of each group being arranged for control from a common point, successive independently variable resistances of each group being arranged for control from successive common points, respectively, a ratio-meter associated with each group connected to respond to the ratio of the voltage across the terminals of its group to the current flowing through its group, and a second ratio-meter having one coil connected in series with said mains and a separate coil connected in parallel to said mains so as to respond to the quotient of the voltage across the mains divided by the current flowing through the several groups in series, said meters being calibrated in values of computation proportional to the values to which they respond.

8. An electric computing system comprising mains connectable to a source of electric supply, a plurality of separate independently variable resistance circuits connected in series across said mains, and a ratio-meter associated with each resistance circuit connected to respond to the ratio of the voltage across the terminals of its associated resistance circuit to the voltage across the mains, means for adjusting the resistance of any of said resistance circuits to a value proportional to a factor of computation, said ratio-meter being calibrated in values of computation proportional to the ratio values to which the meter responds.

9. An electric computing system comprising mains connectable to a source of electric supply, a plurality of separate independently variable resistance circuits connected in series across said mains, means for altering any of said resistances in proportion to a factor of computation to vary the ratio of that resistance to the total resistance of the series and consequently the ratio of the voltage $v$ across that separate resistance to a given voltage $V$ across the whole series of resistances, an electric meter associated with each of said separate resistance circuits having an actuating element connected to the terminals of its associated resistance circuit and thus energized in proportion to the voltage across the terminals of its associated resistance, said meter being calibrated to indicate values proportional to $$\frac{V}{v}$$

translated into values proportional to the quotient of the sum of all the factors of computation divided by the sum of factors represented in the associated separate resistance circuit.

JOHN B. SAXE.